No. 12,245. REISSUED JULY 26, 1904.

A. H. GELTZ & L. L. HOSACK.

TRIPLE VALVE PISTON AND CONNECTION.

APPLICATION FILED MAY 16, 1904.

2 SHEETS—SHEET 1.

Witnesses:
E. V. Mackenzie
Chas. S. Ripley

Inventors:
Albert N. Geltz.
Lee L. Hosack
by C. M. Clarke Atty.

No. 12,245. REISSUED JULY 26, 1904.

A. H. GELTZ & L. L. HOSACK.

TRIPLE VALVE PISTON AND CONNECTION.

APPLICATION FILED MAY 16, 1904.

2 SHEETS—SHEET 2.

Witnesses:
E. J. MacKenzie
Chas. S. Ripley

Inventors
Albert H. Geltz
Lee L. Hosack
by O. M. Clarke Atty

No. 12,245. Reissued July 26, 1904.

UNITED STATES PATENT OFFICE.

ALBERT H. GELTZ, OF ALLIANCE, AND LEE L. HOSACK, OF YOUNGSTOWN, OHIO, ASSIGNORS TO C. B. McLEAN, OF PITTSBURG, PENNSYLVANIA.

TRIPLE-VALVE PISTON AND CONNECTION.

SPECIFICATION forming part of Reissued Letters Patent No. 12,245, dated July 26, 1904.

Original No. 755,570, dated March 22, 1904. Application for reissue filed May 16, 1904. Serial No. 208,295.

*To all whom it may concern:*

Be it known that we, ALBERT H. GELTZ, residing at Alliance, in the county of Stark, and LEE L. HOSACK, residing at Youngstown, in the county of Mahoning, State of Ohio, citizens of the United States, have invented certain new and useful Improvements in Triple-Valve Pistons and Connections, of which the following is a specification.

The invention relates to certain new and useful improvements in air-brakes; and the invention has for its main object to provide means for recharging the auxiliary reservoir to normal pressure without releasing the brakes.

Briefly described, the invention comprises means for admitting the air through the piston of the triple valve from the main reservoir to the auxiliary reservoir independent of the brake-valve while brake-valve is on lap or while communication is cut off between the main reservoir and train-line by the brake-valve and for automatically cutting off the air through the piston when a reduction is made in the train-line. A connection is provided between the reservoir and the train-line pipe independent of the brake-valve, whereby when the brakes have been applied the air may be cut into the train-line from the reservoir direct without passing through the engineer's valve, and the amount of pressure which has been used in the application of the brakes thereby restored to the train-line and the auxiliary reservoir. Means is also provided whereby the cut-in cock arranged between the reservoir and the train-line pipe is automatically operated to close communication between the main reservoir and the train-line pipe when the normal pressure has been restored in the train-line.

In describing the invention in detail reference is had to the accompanying drawings, forming a part of this specification, and wherein like characters of reference indicate like parts throughout the several views, in which—

Figures 1, 2:
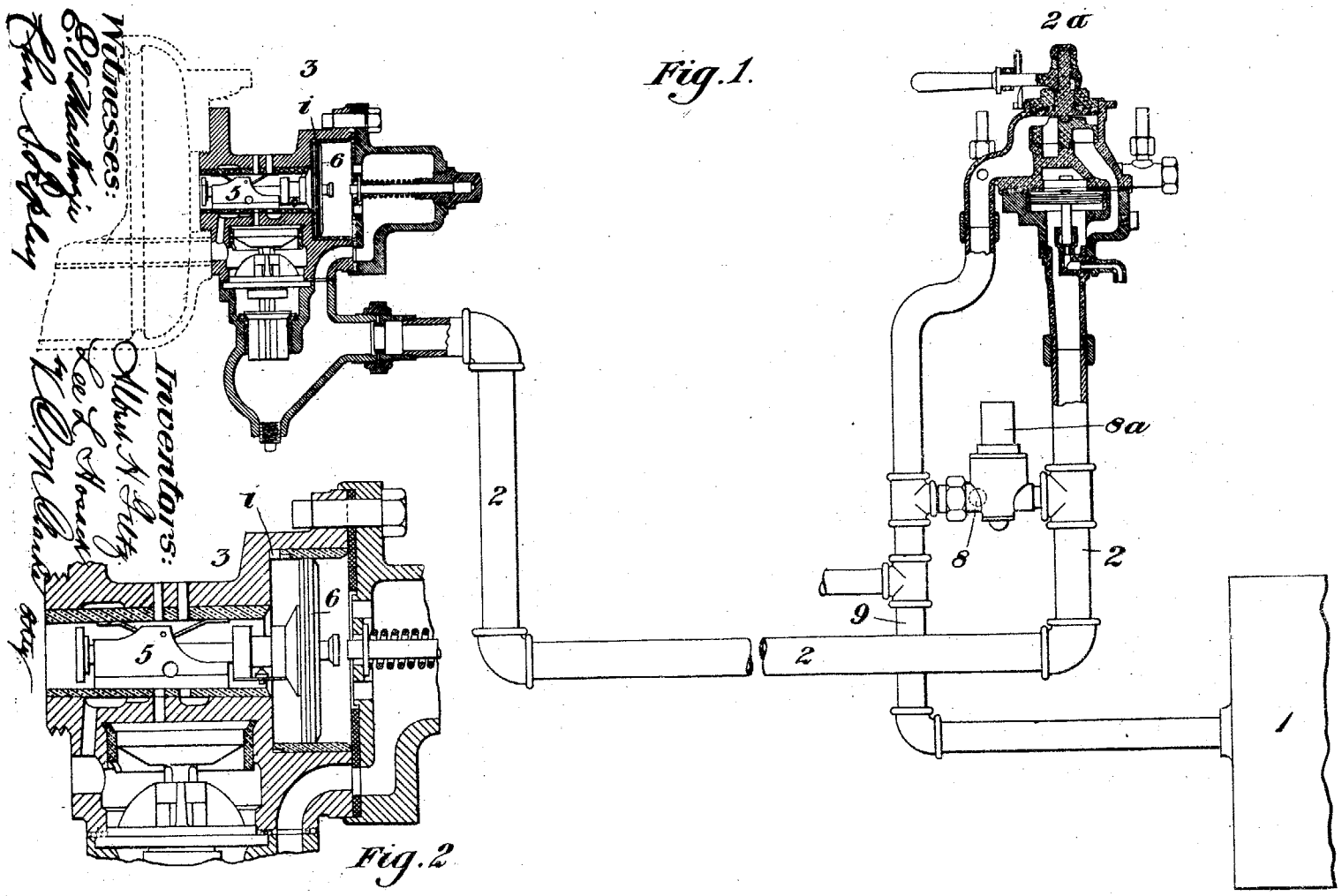
Figure 3:
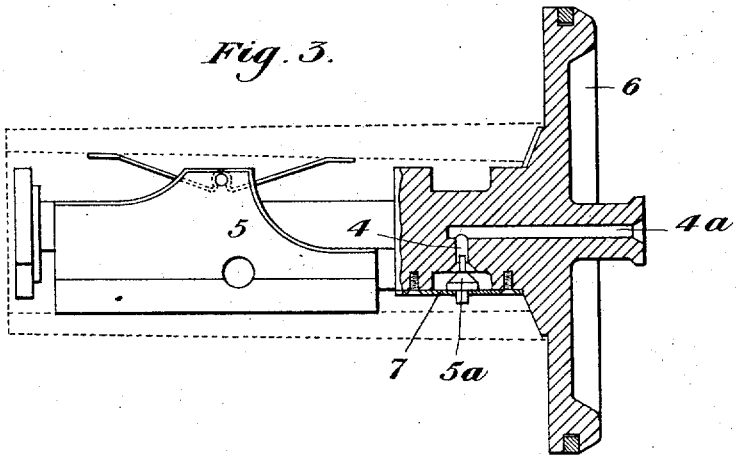
Figure 5:
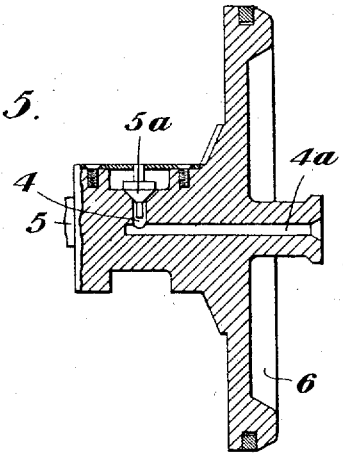
Figure 4:
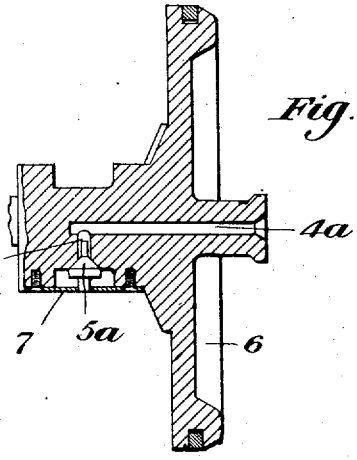
Figure 6:
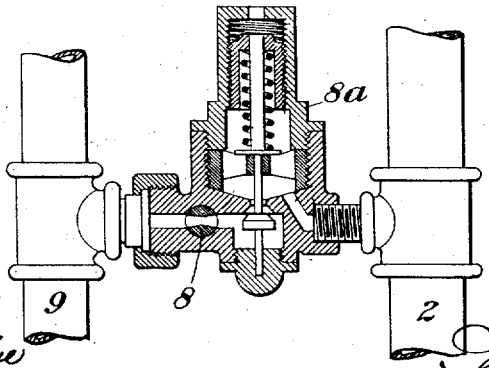

Figure 1 is a diagrammatical view with the triple valve and the engineer's valve in section, showing our improvements in position. Fig. 2 is an enlarged sectional detail view of the triple valve in lap position. Fig. 3 is an enlarged central longitudinal sectional view of the triple-valve piston. Fig. 4 is a partial similar view showing the supply-valve seated. Fig. 5 is a similar view showing the valve located at the upper portion of the piston-rod. Fig. 6 is a sectional view of the governor, showing a part of the reservoir-line and train line or pipe.

In the accompanying drawings, 1 indicates the main reservoir, 2 the train-line pipe connected to the engineer's valve $2^a$ and to the triple valve 3, and 9 indicates the pipe connecting the main reservoir 1 with the engineer's valve $2^a$.

To put our invention in practice, we employ the triple valve of the ordinary type, simply altering the piston thereof to accomplish in connection with the cut-in between the train-line and main reservoir the objects of our invention. In the ordinary triple valve the air passes from the train-line through a port in the triple valve to the auxiliary reservoir. In our device we establish communication between the train-line and the auxiliary reservoir through the piston of the triple valve when the brake-valve is on lap and said port *i* is cut off. To this end the piston-rod 5 and piston-head 6 are provided with a port $4^a$, extending through the head 6 and for some distance into the rod 5 and communicating through a port 4 with the auxiliary reservoir. (Indicated in dotted lines.) This port 4 is normally open and is closed by a valve $5^a$, that may be conveniently retained in position by having its stem working in a plate 7, suitably secured to the piston rod and head, when a reduction is made in the train-line. Arranged between the pipe 9, connecting the reservoir 1 with the engineer's valve and the train-line 2, is cut-in cock 8, by means of which communication is established between the main reservoir 1 and the train-line when the engineer's valve $2^a$ is on lap, which is the condition of this valve after an application of the brakes has been made. This cut-in cock is adapted to be automatically closed by a governor $8^a$ after the normal pressure is restored to the auxiliary reservoir and train-line.

We will assume for the purpose of illustration that the standard pressure being employed in the train-line is seventy pounds. There is consequently, of course, ninety pounds pressure in the main reservoir and seventy pounds in the train-line, in the engineer's brake-valve, in the triple valve, and in the auxiliary reservoir. An application of the brakes is now made, using, we will say, ten pounds of air, reducing the pressure in the train-line and auxiliary reservoir to sixty pounds. As heretofore stated, we now desire to recharge the train-line and auxiliary reservoir to, say, sixty-five pounds pressure while the brakes are still applied. To accomplish this, we operate the cut-in cock 8, opening communication between the main reservoir 1 (through pipe 9) to the train-pipe 2 and through the train-pipe 2, port $4^a$, and port 4 to the auxiliary reservoir, the valve $5^a$ remaining normally open by gravity and maintaining communication from the train side of the triple valve to the auxiliary-reservoir side during such equalization to sixty-five pounds pressure on each side. At this time the automatic governor $8^a$ operates to close the communication between the main reservoir and train-pipe, and the pressure has been raised to, say, sixty-five pounds, with the engineer's valve on lap and the brakes set. It will be observed that valve $5^a$ is normally opened by gravity, maintaining communication when pressures are equal on train side and auxiliary-reservoir side. Upon a reduction of pressure in train-pipe by engineer's valve and movement of triple valve to service position valve $5^a$ becomes seated, maintaining the pressure of sixty-five pounds in the auxiliary reservoir until said pressure has been reduced by brake application (engineer's valve being on lap) again equalizing the pressures, whereupon valve $5^a$ again opens by gravity, allowing pressure to be reëstablished in the auxiliary reservoir from train-pipe side. In this connection we would state that we do not wish to confine ourselves to this arrangement of the port 4 and valve $5^a$, as it will observed that the same result would be accomplished by having the port 4 lead upwardly through the piston-rod instead of downwardly from the port $4^a$, in which construction the valve $5^a$ would remain normally seated by gravity and the port 4 normally closed, and the valve would remain seated during a reduction of air (on train-pipe side) to apply the brakes and would be unseated upon a slight excess of pressure backwardly toward the auxiliary-reservoir side through ports $4^a$ and 4.

When the application of air is made, reducing pressure, we will say, ten pounds in the train-line and auxiliary reservoir, and it is desired to recharge the train-line and auxiliary reservoir while the brakes are still applied, the cut-in cock 8 is operated so as to pass the air from main reservoir 1 through pipe 9 through governor $8^a$ to the train-line pipe 2. The amount of air passed into the train-line pipe is controlled by the governor $8^a$. It is to be noted that at this time the engineer's valve is on lap. The amount of pressure on each side of the piston 6 prior to the opening of the cut-in cock 8 is equal—namely, sixty pounds. The excess pressure pumped into the train-line through cock 8 and governor $8^a$ is not sufficient to force the piston 6 to full release; but valve $5^a$ being open allows this pressure to pass through port $4^a$ and port 4 to the auxiliary reservoir, thus still maintaining an equalization of pressure on both sides of the piston 6. This continues until the desired pressure has been reached, at which time the governor $8^a$ automatically closes communication from the reservoir to the train-line 2, and this governor opens again upon the reduction of pressure in said train-line, this equalization continuing as long as the cut-in cock is in the open position.

Having fully described our invention, what we claim as new, and desire to secure by Letters Patent, is—

1. A triple-valve piston provided with an axial port extending partially through its stem, and a radial valve-seated port adapted to establish communication from the train-pipe to the auxiliary reservoir, and a valve adapted to open and close said radial port, substantially as set forth.

2. A triple-valve piston provided with an axial port extending partially through its stem, and a radial valve-seated port adapted to establish communication from the train-pipe to the auxiliary reservoir, a valve adapted to open and close said radial port, and a guiding-bearing therefor, substantially as set forth.

3. A triple-valve piston provided with an axial port extending partially through its stem, and a radial valve-seated port adapted to establish independent communication from the train-pipe to the auxiliary reservoir when the engineer's valve is on lap; a valve adapted to open and close said radial port, and a guiding-bearing therefor, substantially as set forth.

4. A triple-valve piston provided with an axial port extending partially through its stem, and a radial valve-seated port adapted to establish communication from the train-pipe to the auxiliary reservoir, a gravity-actuated valve adapted to open said radial port when the pressure in the auxiliary reservoir and train-line is equalized, and to close it when the pressure in the train-line reduced, substantially as set forth.

5. The combination with the piston of a triple valve provided with an axial port-opening leading from the train-line, and a radial port communicating therewith opening toward the auxiliary reservoir, and provided with a valve-seat; of a valve adapted to seat against said port toward the train-line, substantially as set forth.

6. The combination with the piston of a triple valve provided with an axial port-opening leading from the train-line and a radial port communicating therewith opening toward the auxiliary reservoir, and provided with an under-valve seat; of a valve adapted to seat against said port toward the train-line, and to open by gravity, substantially as set forth.

7. In air-brakes, the combination with the train-line triple valve and the auxiliary reservoir, of a triple-valve piston provided with a port communicating from the train-pipe side to the auxiliary-reservoir side, provided with a gravity-actuated valve adapted to remain open during equalization of pressure and to be seated upon a reduction of pressure on the train-pipe side, substantially as set forth.

In testimony whereof we affix our signatures in the presence of two witnesses.

ALBERT H. GELTZ.
LEE L. HOSACK.

Witnesses:
ROBT. O. KIELING,
CLARE H. BARKER.